United States Patent [19]
Zahuranec et al.

[11] Patent Number: 5,869,947
[45] Date of Patent: *Feb. 9, 1999

[54] RECHARGEABLE HAND HELD VACUUM CLEANER WITH ELECTRICAL CONNECTIONS CIRCUIT BOARD WITH SPRING CONTACTS

[75] Inventors: Terry L. Zahuranec, North Olmsted; Robert A. Vystrcil, West Farmington; Paul D. Stephens, Cleveland Heights; Robert A. Salo, Willoughby Hills, all of Ohio

[73] Assignee: Royal Appliance Mfg. Co., Cleveland, Ohio

[ * ] Notice: The terminal 20 months of this patent has been disclaimed.

[21] Appl. No.: 372,659

[22] Filed: Jan. 13, 1995

[51] Int. Cl.⁶ .............................. H01M 10/44; H02J 7/10
[52] U.S. Cl. ................................................ 320/2; 361/785
[58] Field of Search ............................ 320/2; 15/DIG. 1; 30/DIG. 1; 339/119 C; 361/785

[56] References Cited

U.S. PATENT DOCUMENTS

| | | |
|---|---|---|
| 4,225,814 | 9/1980 | Gantz et al. ................................. 320/2 |
| 4,573,234 | 3/1986 | Kochte et al. . |
| 4,610,048 | 9/1986 | Ishihara et al. . |
| 4,665,582 | 5/1987 | Richmond et al. . |
| 4,670,701 | 6/1987 | Sako et al. . |
| 4,739,452 | 4/1988 | Fukunaga ................................. 361/399 |
| 4,920,608 | 5/1990 | Hult et al. . |
| 4,934,020 | 6/1990 | Jackson . |
| 4,974,121 | 11/1990 | Masuko et al. .......................... 361/428 |
| 5,035,024 | 7/1991 | Steiner et al. ............................. 15/339 |
| 5,301,494 | 4/1994 | Peot et al. ................................. 56/10.5 |
| 5,355,282 | 10/1994 | Yokemura et al. ...................... 361/760 |
| 5,396,162 | 3/1995 | Brilmyer ..................................... 320/2 |

*Primary Examiner*—Peter S. Wong
*Assistant Examiner*—Gregory J. Toatley, Jr.

[57] ABSTRACT

A rechargeable cordless vacuum cleaner system comprises a hand held vacuum cleaner and a separable charger. The cleaner includes a circuit board assembly having first and second sets of contacts disposed for engagement to first and second sets of mating contacts of a battery pack and the charger. Both sets of contacts are spring loaded for resilient engagement to the mating contacts. A pocket portion is formed adjacent the set of contacts to the charger to avoid direct exposure of the contacts to an operator of the cleaner.

8 Claims, 6 Drawing Sheets

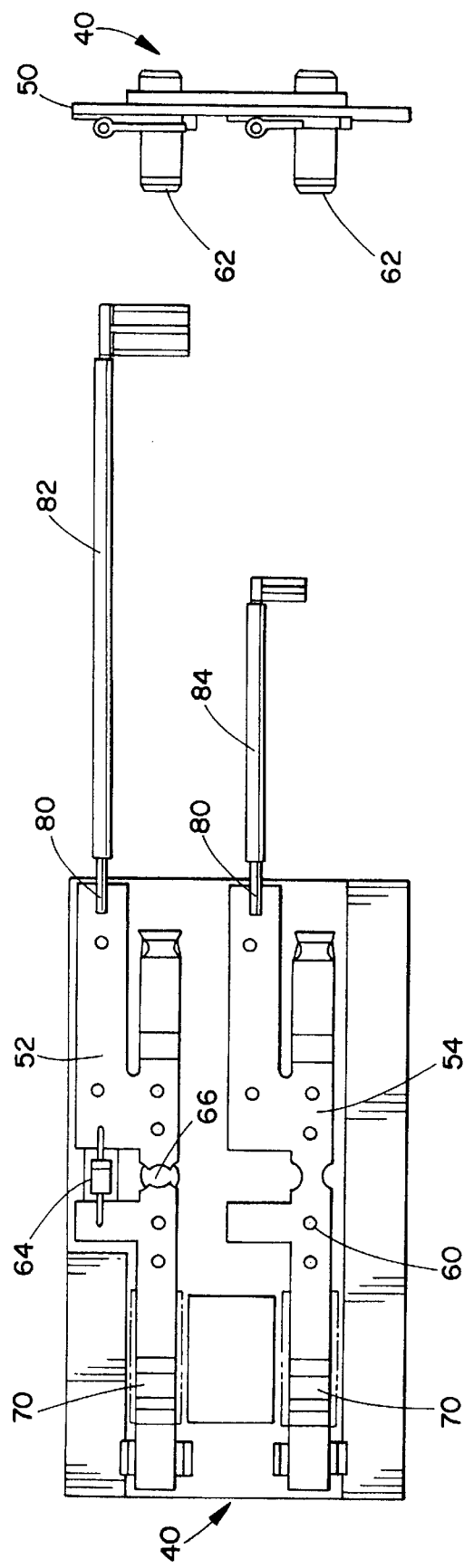
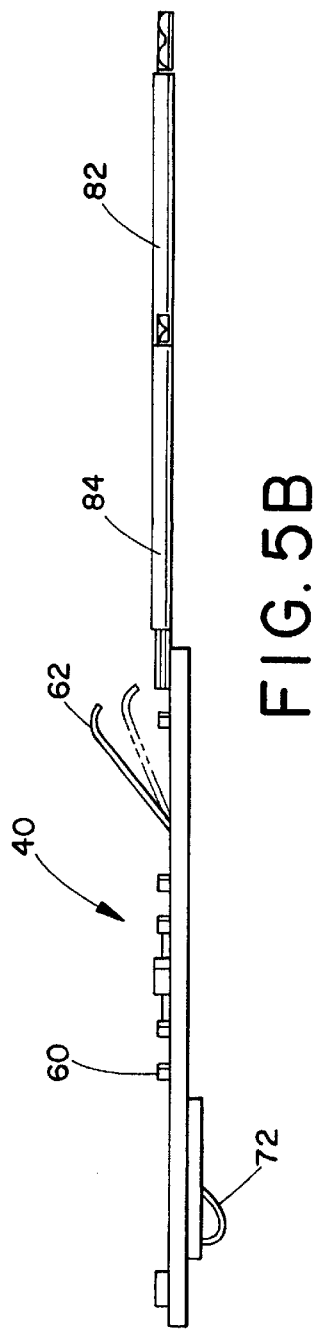
FIG. 5A
FIG. 5B
FIG. 5C

RECHARGEABLE HAND HELD VACUUM CLEANER WITH ELECTRICAL CONNECTIONS CIRCUIT BOARD WITH SPRING CONTACTS

BACKGROUND OF THE INVENTION

The subject invention pertains to rechargeable appliances, and more particularly a cordless vacuum cleaner storing and recharging system.

The invention is particularly applicable to an electrical connection system for supplying power to the motor of a cordless hand vacuum from a battery pack, and then subsequently recharging the battery pack when stored in the recharger device, and will be described with particular reference thereto. However, it will be appreciated that the invention has broader applications such as any type of electrical connection system requiring selective connection to either a battery pack or a recharging device and may be advantageously employed in such other environments and applications.

Cordless hand vacuum cleaner systems are well known and have typically comprised a separable vacuum cleaner unit which can be stored and recharged in a charger base provided with an electrical connection system to communicate power, typically from a standard AC outlet, through a step-down transformer to the batteries. Usually, the storing and charging base will include male terminals which extend outwardly of a base surface and are received in an electrical receptacle of the vacuum cleaner. Accordingly, it is necessary that the receptacles be exposed for ready reception of the charging terminals.

Further, hand vacuums have typically employed a battery pack requiring wiring connection to both the cleaning unit receptacles, the motor and a switch. Such wiring connections are normally undesirable in the home appliance industry where simplicity of manufacture and consequent ease in assembly are greatly valued. Such prior art systems thus will usually include some wire and plug arrangement between the charger base contacts and the battery pack, and then further wiring up to the switch and the motor. All of such wiring and plug arrangements are undesirable for cost and assembly reasons.

Another problem identified in prior art systems involve the connection schemes between the vacuum cleaner and the recharging base. Where an exposed receptacle is included to receive male terminals from the recharging base, not only are such exposed receptacle contacts undesirable from a safety point, but they tend to further collect dust and dirt, particularly in a vacuum cleaning operation.

The present invention contemplates a new and improved device which overcomes all of the above-referred to problems and others to provide a new cordless, rechargeable vacuum cleaning system which is simple in design, economical to manufacture, and which provides improved safety over conventional systems.

BRIEF SUMMARY OF THE INVENTION

In accordance with the present invention, there is provided a rechargeable cordless vacuum cleaner system comprising a hand held vacuum cleaner and a separable charger. The cleaner includes a circuit board having first and second sets of electrical contacts for communicating electrical energy to a motor in the vacuum cleaner from a battery pack and to the battery pack during recharging, respectively. The first set of contacts are disposed to engage the rechargeable battery pack contacts when the battery pack is received in the cleaner. The second set of contacts are disposed to engage contacts at the charger when the cleaner is received in the charger. The circuit board preferably comprises a panel having first and second sides. The first set of contacts deflect away from the first side of the panel and are adapted for resilient engagement to the battery pack contacts. The second set of contacts comprises a half-loop extending through the panel and adapted for resilient engagement to the recharger contacts on the second side of the panel.

In accordance with another aspect of the present invention, the cleaner includes a pocket adjacent the second set of contacts to receive the contacts of the charger when the cleaner is received therein and to hold both the second set of cleaner contacts and the charger contacts in the proper position for the recharging. The pocket includes an outer wall disposed to cover and preclude direct exposure of the second set of contacts when the unit is out of the charger base.

In accordance with a further aspect of the present invention, the second set of cleaner contacts are configured to form a cantilevered spring to wipe and clean the contacts of the charger as the cleaner is received in the charger. The second set of contacts are sized to extend through the outer wall for ready engagement of the contacts of the charger.

In accordance with a more limited aspect of the present invention, the cleaner comprises first and second housing halves. Each of the housing halves include wall slots to closely receive the circuit board for securing the circuit board in the cleaner upon fastening the housing halves together.

In accordance with another more limited aspect of the present invention, the circuit boards include a third set of contacts including wire lead connections for the motor and a switch assembly.

One benefit obtained by the use of the present invention is a circuit board assembly which simply and reliably communicates electrical energy to both the battery pack and the motor, and connects to a charger base without plug and wire lead assemblies.

Another benefit obtained from the present is a cleaning unit which protects and covers the contacts of the cleaner which engage the charging unit contacts.

Other benefits and advantages for the subject new rechargeable cordless vacuum cleaner system will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof and wherein:

FIGS. 5a–5c comprise elevated views of a circuit board assembly formed in accordance with the present invention.

DETAILED DESCRIPTION OF THE INVENTION

Figure 1:
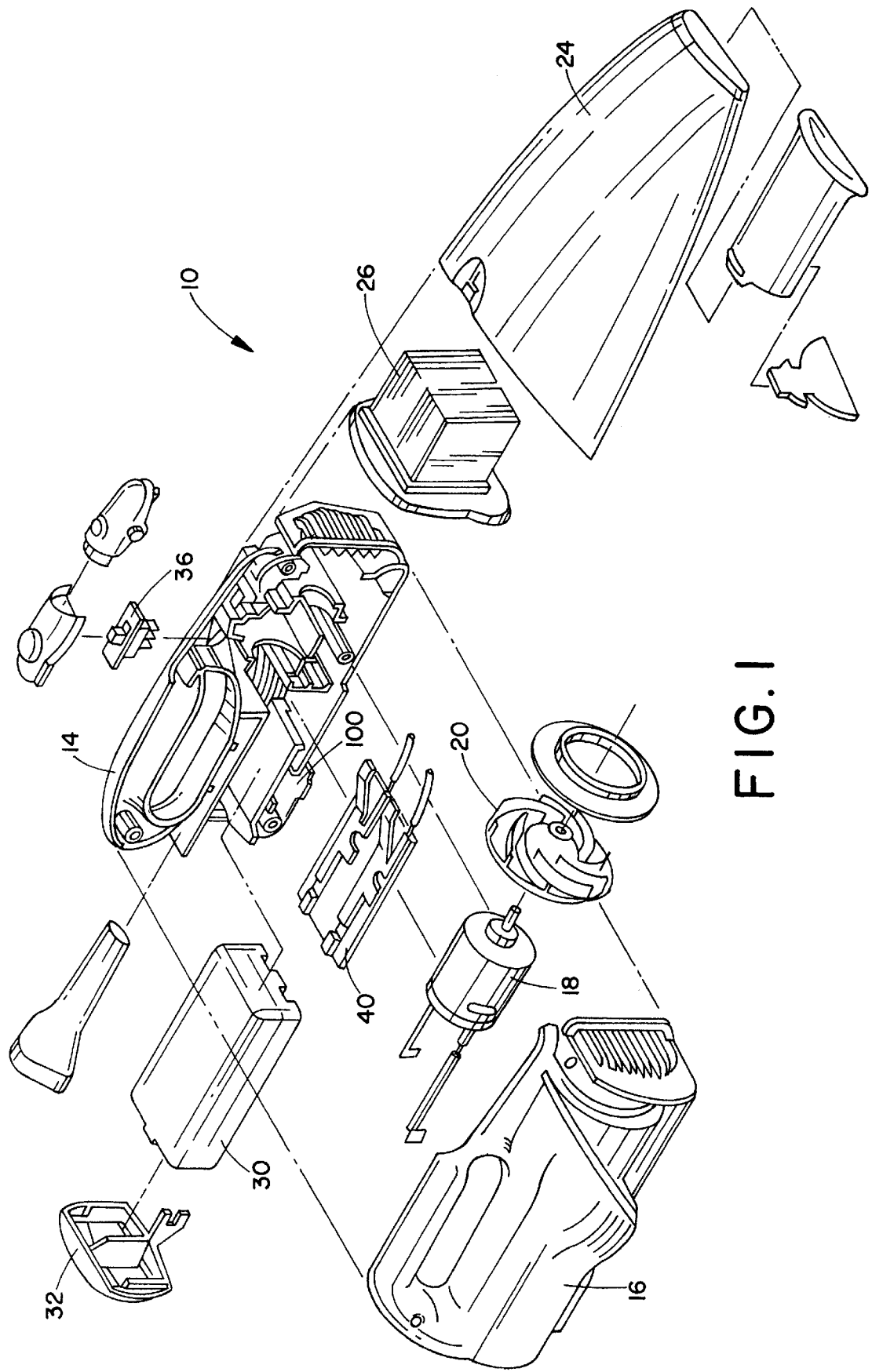
FIG. 1 is an exploded view of a cleaning unit formed in accordance with the present invention.

Referring now to the drawings, wherein the showings are for purposes of illustrating the preferred embodiments of the invention only and not for purposes of limiting the same, the FIGURES show a rechargeable cordless vacuum cleaner system comprising a cleaner 10 and a charger 12, wherein the cleaner is intended to be battery powered during normal use and received in the charger to recharge an internal battery pack during storage.

Figure 2:
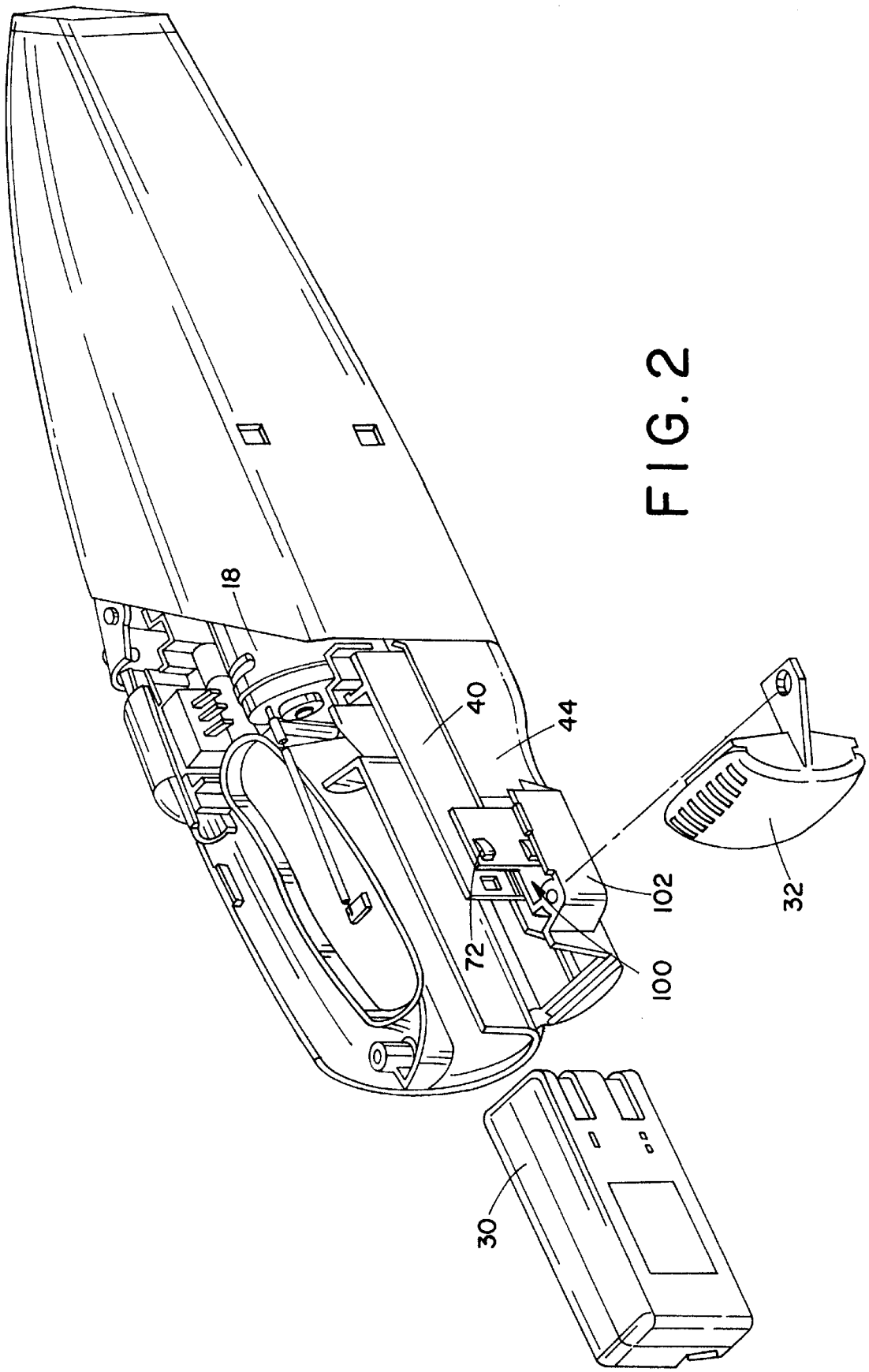
FIG. 2 is a partly assembled, partly cross-sectional view showing a battery pack readily positioned for insertion into the hand vacuum.
Figure 3:
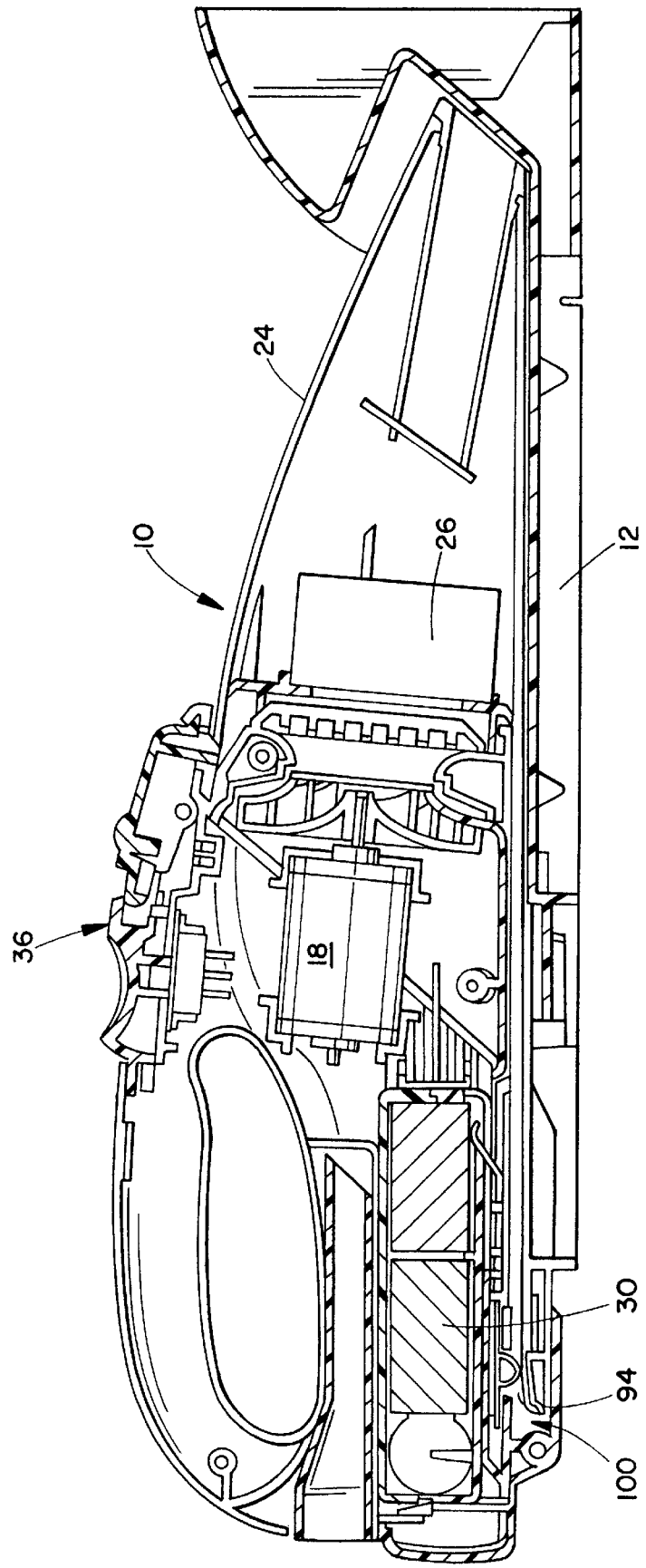
FIG. 3 is a cross-sectional view of an assembled cleaning unit received on the charger base.

More specifically and with reference to FIGS. 1 and 2, the cleaner is comprised of first and second motor housing body halves 14 and 16, which are connected together in a conventional fastening arrangement with conventional fastening devices. A motor 18 powers a fan assembly 20 to create a vacuum in the nozzle 24 for the suction of dirt and dust. Such dirt and dust is separated from the working air drawn in by the operating fan 20 by a filter assembly 26. The housing halves further contain a battery pack 30, which is selectively insertable and removable from the housing through a rotating battery cover 32, a switch assembly 36 for turning the cleaner ON and OFF and a circuit board assembly 40 for communicating electrical energy from the battery pack 30 to the motor 18 for the recharging of the battery pack from the charger base 12 as will hereinafter be more fully explained.

The circuit board assembly is received in the housing halves by close reception in slot 42 formed between the cleaner outer wall 44 and a battery pack support wall 46. In assembly, the circuit board assembly 40 merely slides in the slot 42 and upon fastening of the housing halves together is secured therein.

Figure 4:
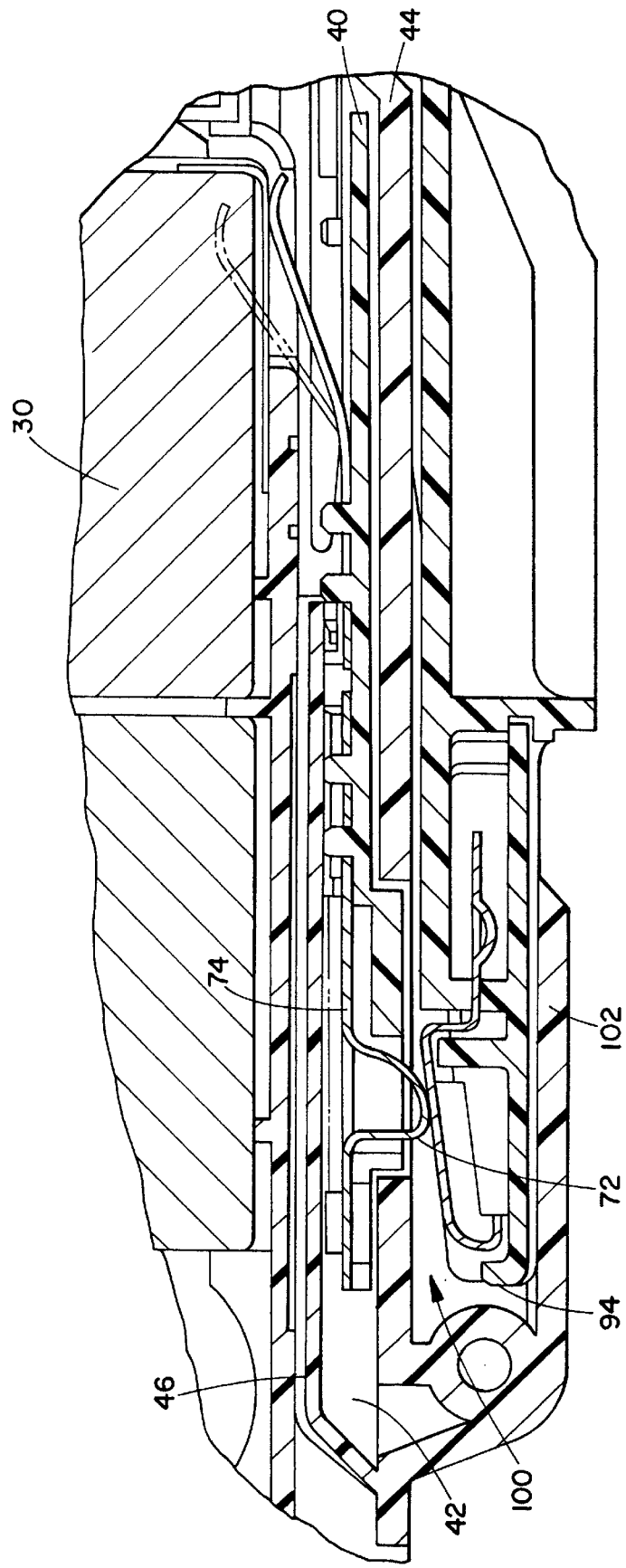
FIG. 4 is an enlarged cross-sectional view showing a detail of the connections between the contacts of the cleaner and the charger base.

With particular reference to FIGS. 5a–5c, a detail of the circuit board 40 is shown. The circuit board comprises a panel member 50 constructed of a non-conductive, preferably plastic material on which is supported first and second conductive elements 52, 54 forming the desired sets of electrical contacts. It can be seen that the conductive elements 52, 54 are supported on a first or top side of the panel 50 by a plurality of posts 60, which are preferably heat staked to hold the conductive elements in place. More particularly, the conductive elements 52, 54 are intended to lay flat on the board except for contact portions which are resiliently spaced therefrom. The first set of contact elements 62 are best shown in FIG. 5b as deflecting away from the panel towards opposed and mating contacts on the battery pack 40. FIG. 4 shows one of the contacts in dashed line in a position when the battery pack is absent from the cleaner and in solid line in electrical communication contact with the battery pack electrical contact. The resilient deflection of the first set of contacts by the battery pack as it is inserted in the cleaner assures a good electrical connection and is important due to the jarring movement that the cleaner will be subjected to during normal use. As noted above, most prior art units would employ a battery pack of the type which would include wire leads from the battery pack going to a plug unit for connection to the motor or to a receptacle for receiving the male terminals from a charger base. The subject invention avoids this undesirable feature by the contacting arrangement shown herein. The first conductive element 52 is broken into first and second parts by a diode 64 and insulator 66, while the second conductive element 54 is maintained as a single element. The purpose of this arrangement is to avoid an electrical short of the battery contacts during the recharging process. The diode 64 will only allow electrical conductance of current in a single direction from the charger through to the battery, and not vice versa. A second set of electrical contacts 70 are formed at the opposite ends of the conductive elements 52, 54 from the first set of contacts and are disposed to engage contacts of the charger when the cleaner is received in the charger. As best seen in FIG. 4, it can be seen that the second set of contacts 70 comprise a half-loop 72 of the conductive element that pass through a cutout in the panel member from the top side to the bottom side. It is important that the contact 72 be dimensioned to not only extend through the panel member, but also through the outer wall 44 of the cleaner to the extent to be able to engage adjacent contact elements of the charger 12. The second contact elements are also disposed to deflect. A section 74 of each conductive element acts as a cantilever spring to allow the contact 72 to move as the charger base is inserted into an engagement position which provides a wiping action across the contact 72, and helps keep the contacts clean.

With particular reference to FIG. 5a, a third set of contacts, or connections 80 are made to the conductive elements 52, 54, comprising first and second wire leads 82, 84, which are respectively connected to the switch assembly 36 and motor 18. The lead ends of the wire leads 82, 84 must be soldered or welded to the conductive elements 52, 54, so that they can withstand twenty pounds (20 lbs.) of pull for one minute which is a standard specification for such a circuit arrangement.

Figure 6:
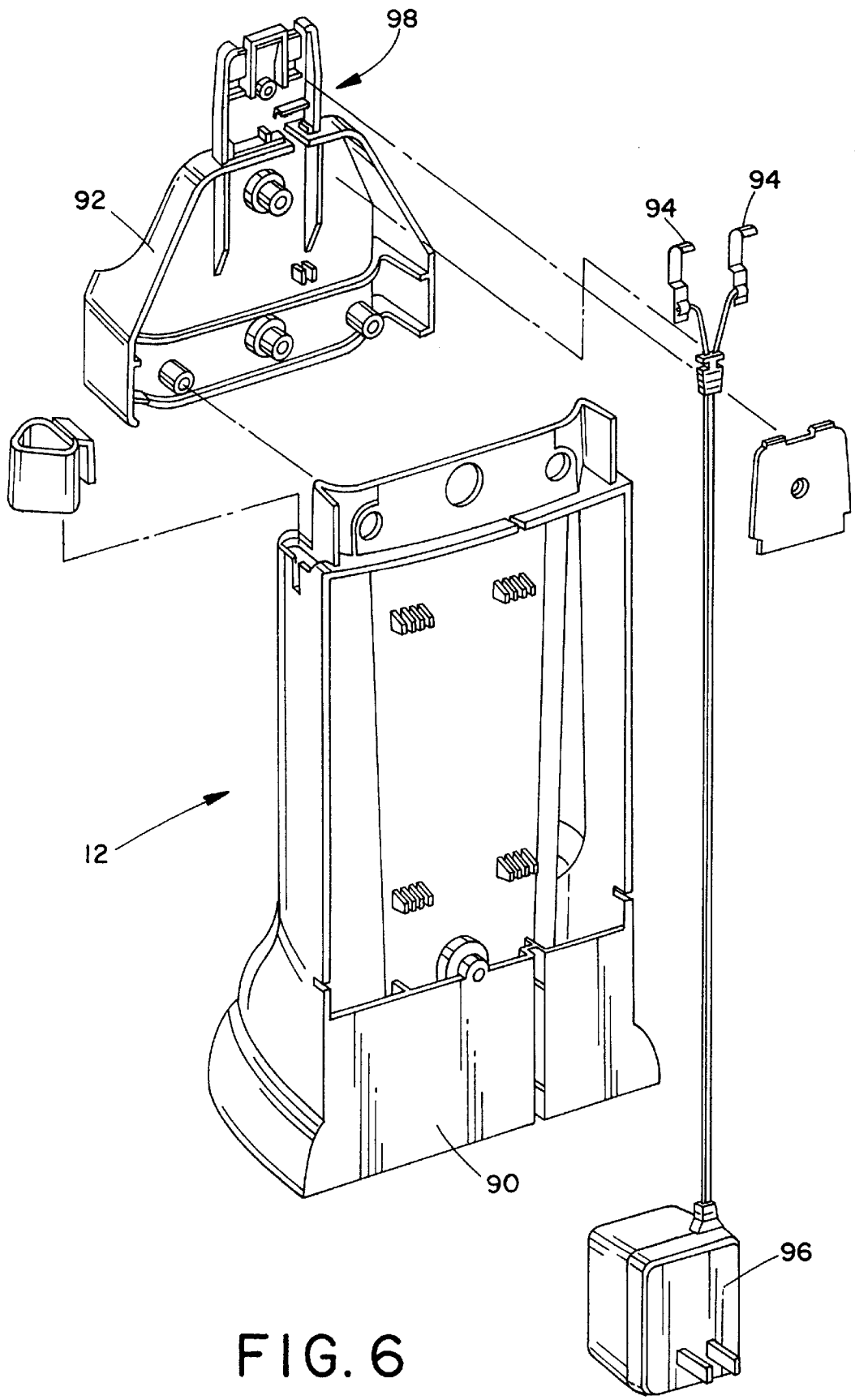
FIG. 6 comprises an exploded view of a charger base.

With particular reference to FIGS. 4 and 6, the charger of the subject invention will be explained, as well as the details of its insertion into and electrical contact with the cleaner 10. The charger is comprised of a stand 90, preferably constructed of a plastic material to which is attached a support element 92 for the charger contacts 94. The charger 12 can be disposed either flat on a counter or wall-mounted. A step-down transformer 96 supplies the appropriate amount of energy to the contacts 94 from a conventional household outlet. The contacts 94 are supported in charger end support portion 98 which is sized to be received in a pocket portion 100 of the cleaner body 14, 16. The pocket 100 is adjacent the second set of contacts 72 projecting through the cleaner outer wall 44 to receive the contacts 94 of the charger when the cleaner is received in the charger and holds both the second set of contacts 72 and the charger contacts 94 in the proper position for the recharging. The pocket 100 includes an outer wall 102 disposed to cover and preclude direct exposure of the second set of contacts 72 when the cleaner is separated from the charger 12. Further, as the cleaner is inserted onto the charger to make an electrical connection between the second set of contacts 72 and the charger contacts 94, the cantilever spring action of the second set of contacts allows movement of the contacts so that they can wipe and clean the contacts of the charger as the cleaner is received in the charger.

The subject invention has the important operational and structural advantages of a circuit board assembly where both the battery contacts and the contacts of the charger base are combined together in a single assembly. A set of wire leads going off the board, one to the motor and one to the switch, makes for an easy method of assembly and improved simplicity for the convenience of an assembler. Both sets of electrical contacts on the circuit board assembly are spring-loaded to assure and maintain proper communication of electrical energy as desired.

The invention has been described with reference to preferred embodiments. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A rechargeable cordless vacuum cleaner system comprising a hand-held vacuum cleaner and a separable charger, wherein the cleaner includes a circuit board having first and second sets of electrical contacts for communicating electrical energy from a battery pack to a motor in the vacuum cleaner and from the charger to the battery pack during recharging, respectively, and circuit means for communicating the electrical energy from the second set of contacts to the first set of contacts, the first set of contacts being disposed to engage rechargeable battery pack contacts when the battery pack is received in the cleaner, and the second set of contacts being disposed to engage contacts of the charger for recharging the battery pack when the cleaner is received in the charger, the first and second sets of electrical contacts both comprising spring contacts for avoiding wiring harness connections to the battery pack and the charger; and, further including means for precluding an electrical short of the battery contacts during the recharging.

2. The system as defined in claim 1 wherein the cleaner includes a pocket adjacent the second set of contacts to receive the contacts of the charger when the cleaner is received therein and hold both the second set of contacts and the charger contacts in a proper position for the recharging.

3. The system as defined in claim 2 wherein the pocket includes an outer wall disposed to cover and preclude direct exposure of the second set of contacts.

4. The system as defined in claim 1 wherein the second set of contacts are configured to form a cantilever spring that wipe and clean the contacts of the charger as the cleaner is received in the charger.

5. The system as defined in claim 1 wherein the circuit board comprises a panel member wherein the first set of contacts are on a first side of the panel member and the second set of contacts are on a second side of the panel member, the first and second set of contacts being configured of first and second common conductive elements, respectively, the second set of contacts being configured to pass through the panel member from the first side to the second side.

6. The system as defined in claim 5 wherein the circuit board is disposed adjacent an outer wall of the cleaner, said outer wall including a cut-out to receive the second set of contacts and wherein the second set of contacts are sized to extend through the outer wall for ready engagement of the contacts of the charger.

7. The system as defined in claim 5 wherein the first set of contacts deflect away from the panel member for ready engagement of the battery contacts and are each in electrical series with wire leads going to the motor and a switch.

8. The system as defined in claim 1 wherein the cleaner comprises first and second housing halves, each of the housing halves including wall slots to closely receive the circuit board for securing the circuit board in the cleaner upon fastening the housing halves together.

* * * * *